(12) United States Patent
Lee et al.

(10) Patent No.: US 11,270,420 B2
(45) Date of Patent: Mar. 8, 2022

(54) METHOD OF CORRECTING IMAGE ON BASIS OF CATEGORY AND RECOGNITION RATE OF OBJECT INCLUDED IN IMAGE AND ELECTRONIC DEVICE IMPLEMENTING SAME

(71) Applicant: Samsung Electronics Co., Ltd., Suwon-si (KR)

(72) Inventors: Changgwun Lee, Hwaseong-si (KR); Ildo Kim, Suwon-si (KR); Jaeho Lee, Seoul (KR); Hyeyun Jung, Seoul (KR); Kihuk Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/651,997

(22) PCT Filed: Sep. 20, 2018

(86) PCT No.: PCT/KR2018/011083
§ 371 (c)(1),
(2) Date: Mar. 27, 2020

(87) PCT Pub. No.: WO2019/066373
PCT Pub. Date: Apr. 4, 2019

(65) Prior Publication Data
US 2020/0265569 A1    Aug. 20, 2020

(30) Foreign Application Priority Data

Sep. 27, 2017    (KR) .................. 10-2017-0125087

(51) Int. Cl.
*G06T 5/50*        (2006.01)
*G06F 3/0482*      (2013.01)
*G06K 9/62*        (2022.01)

(52) U.S. Cl.
CPC .............. *G06T 5/50* (2013.01); *G06F 3/0482* (2013.01); *G06K 9/6267* (2013.01);
(Continued)

(58) Field of Classification Search
CPC ................... G06T 5/50; G06T 2200/24; G06T 2207/20104; G06T 2207/20212; G06F 3/0482; G06F 2203/04803; G06K 9/6267
See application file for complete search history.

(56) References Cited

U.S. PATENT DOCUMENTS 9,659,350 B2    5/2017 Kobayashi
10,346,893 B1 *  7/2019 Duan .................... G06F 16/287
(Continued)

FOREIGN PATENT DOCUMENTS

KR    10-1523740 B1    5/2015
KR    10-1606760 B1    3/2016
(Continued)

OTHER PUBLICATIONS

International Search Report dated Jan. 4, 2019 in connection with International Patent Application No. PCT/KR2018/011083, 2 pages.
(Continued)

*Primary Examiner* — Beau D Spratt

(57) ABSTRACT

Various embodiments provide an electronic device and a method, the electronic device comprising a communication module, a memory, and a processor, wherein the processor is configured to: recognize at least one object from among one or more objects by using an image containing the one or more objects; identify a recognition rate and a category corresponding to the at least one object at least on the basis of the recognition; obtain at least one reference image corresponding to the object at least on the basis of the category; when the recognition rate satisfies a first specified condition associated with the recognition rate corresponding (Continued)

to the category, correct the at least one object or an area corresponding to the at least one object by using a reference image, which satisfies the first specified condition, from among the at least one reference image; and when the recognition rate satisfies a second specified condition associated with the recognition rate corresponding to the category, correct the at least one object or the area corresponding to the at least one object by using a reference image selected in accordance with an input from among the at least one reference image. In addition, other embodiments are also possible.

15 Claims, 10 Drawing Sheets

(52) U.S. Cl.
CPC  *G06F 2203/04803* (2013.01); *G06T 2200/24* (2013.01); *G06T 2207/20104* (2013.01); *G06T 2207/20212* (2013.01)

(56) References Cited

U.S. PATENT DOCUMENTS

| | | | |
|---|---|---|---|
| 2010/0172551 A1* | 7/2010 | Gilley | G06K 9/6254 382/118 |
| 2010/0260426 A1* | 10/2010 | Huang | G06K 9/00671 382/218 |
| 2011/0268369 A1* | 11/2011 | Richards | G06T 7/97 382/284 |
| 2013/0016899 A1* | 1/2013 | Li | G06K 9/6201 382/159 |
| 2013/0034295 A1* | 2/2013 | Tsuchinaga | G06K 9/6857 382/153 |
| 2015/0235110 A1* | 8/2015 | Curtis | G06K 9/00677 382/224 |
| 2017/0017833 A1 | 1/2017 | Watanabe et al. | |
| 2017/0236032 A1* | 8/2017 | Lin | G06K 9/6262 382/159 |
| 2021/0287274 A1* | 9/2021 | Nguyen | G06Q 30/0631 |

FOREIGN PATENT DOCUMENTS

| | | |
|---|---|---|
| KR | 10-2016-0037115 A | 4/2016 |
| KR | 10-2016-0068516 A | 6/2016 |
| KR | 10-1747511 B1 | 6/2017 |

OTHER PUBLICATIONS

Written Opinion of the International Searching Authority dated Jan. 4, 2019 in connection with International Patent Application No. PCT/KR2018/011083, 7 pages.

Notice of Preliminary Rejection dated May 6, 2021 in connection with Korean Application No. 10-2017-0125087, 18 pages.

Notice of Patent Grant dated Jan. 5, 2022 in connection with Korean Patent Application No. 10-2017-0125087, 4 pages.

Notice of Final Rejection dated Nov. 25, 2021 in connection with Korean Patent Application No. 10-2017-0125087, 6 pages.

\* cited by examiner

METHOD OF CORRECTING IMAGE ON BASIS OF CATEGORY AND RECOGNITION RATE OF OBJECT INCLUDED IN IMAGE AND ELECTRONIC DEVICE IMPLEMENTING SAME

CROSS-REFERENCE TO RELATED APPLICATIONS

This application is a 371 of International Application No. PCT/KR2018/011083 filed on Sep. 20, 2018, which claims priority to Korean Patent Application No. 10-2017-0125087 filed on Sep. 27, 2017, the disclosures of which are herein incorporated by reference in their entirety.

BACKGROUND

1. Field

Various embodiments relate to a method and a device for correcting an image based on the category and recognition rate of an object included in an image.

2. Description of Related Art

Recently, with the development of digital technologies, various types of electronic devices, such as mobile communication terminals, personal digital assistants (PDAs), electronic organizers, smart phones, tablet personal computers (PCs), wearable devices, and the like, have come to be widely utilized. Further, the electronic devices have continuously improved hardware parts and/or software parts thereof in order to support and increase functions.

For example, an electronic device may acquire an image (e.g. a raw image) from a camera embedded therein, may correct the acquired image, and may provide the corrected image to a user. The electronic device may use an image signal processor (ISP) to correct an image. The image signal processor may process an image by using an image quality enhancement algorithm and thus may provide the enhanced image.

An electronic device may be linked with an image-processing cloud system to provide an enhanced image. The electronic device may transmit an image acquired from a camera to a cloud server, and the cloud server may perform a process, such as an image matching technique, which is difficult to perform in the electronic device, so as to correct the image transmitted from the electronic device. For example, the cloud server may correct the image by using machine learning-based software.

Various embodiments may provide a method and a device for additionally correcting a corrected image according to a user's selection.

SUMMARY

In accordance with various embodiments, an electronic device may include: a communication module; a memory; and a processor, wherein the processor may be configured to: recognize at least one of one or more objects by using an image including the one or more objects; identify, based at least on the recognition, a recognition rate and a category corresponding to the at least one object; acquire, based at least on the category, at least one reference image corresponding to the object; when the recognition rate satisfies a first designated condition related to the recognition rate corresponding to the category, correct the at least one object or a region corresponding to the at least one object by using a reference image satisfying the first designated condition among the at least one reference image; and, when the recognition rate satisfies a second designated condition related to the recognition rate corresponding to the category, correct the at least one object or the region corresponding to the at least one object by using a reference image, selected according to an input, from among the at least one reference image.

In accordance with various embodiments, an electronic device may include: a memory; a display; and a processor functionally connected to the memory or the display, wherein the processor may be configured to: recognize at least one object included in an image; correct the image based on the recognized object; display the corrected image and a reference image associated with the recognized object on the display; and additionally correct the corrected image by using a reference image selected according to a user input.

In accordance with various embodiments, an operation method of an electronic device may include: recognizing at least one object included in an image; correcting the image based on the recognized object; displaying the corrected image and a reference image associated with the recognized object; and additionally correcting the corrected image by using a reference image selected according to a user input.

According to various embodiments, a cloud environment can be used to correct an image, thereby making it possible to enhance the recognition and correction (or restoration) quality of a subject (e.g. an object) through user involvement.

According to various embodiments, on the basis of a correction degree for each object included in an image, the image can be additionally corrected using a reference image associated with the object.

According to various embodiments, a corrected image can be additionally corrected based on a user input for selecting an object in the corrected image.

DETAILED DESCRIPTION

Figure 1:
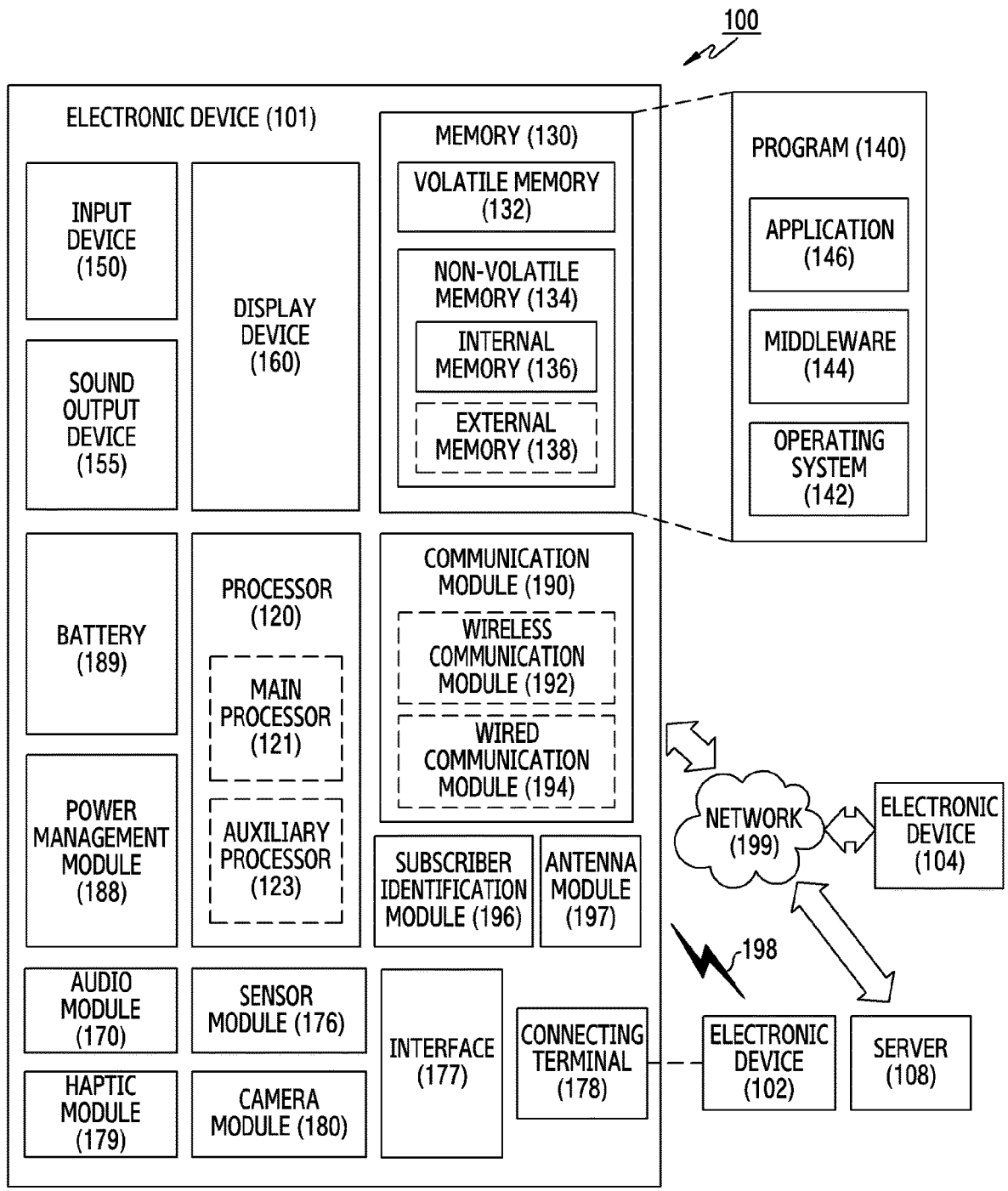
FIG. 1 is a block diagram of an electronic device in a network environment according to various embodiments.

Hereinafter, various embodiments of the disclosure will be described with reference to the accompanying drawings.

However, it should be understood that there is no intent to limit the disclosure to the particular forms disclosed herein; rather, the disclosure should be construed to cover various modifications, equivalents, and/or alternatives of embodiments of the disclosure. In describing the drawings, similar reference numerals may be used to designate similar constituent elements. Various embodiments disclosed herein are provided merely to easily describe technical details of the disclosure and to help the understanding of the disclosure, and are not intended to limit the scope of the disclosure. Therefore, it should be construed that all modifications and changes or modified and changed forms based on the technical idea of the disclosure fall within the scope of the disclosure.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly.

According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

According to an embodiment, the wireless communication module 192 may identify and authenticate the electronic device 101 in a communication network, using subscriber information stored in the subscriber identification module 196.

The antenna module 197 may include one or more antennas for transmitting or receiving a signal or power to or from the outside. According to one embodiment, the communication module 190 (e.g. the wireless communication module 192) may transmit or receive a signal to or from an external electronic device through an antenna suitable for a communication scheme.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101.

According to an embodiment, all or some of operations to be executed at the electronic device 101 may be executed at one or more of the external electronic devices 102, 104. According to an embodiment, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
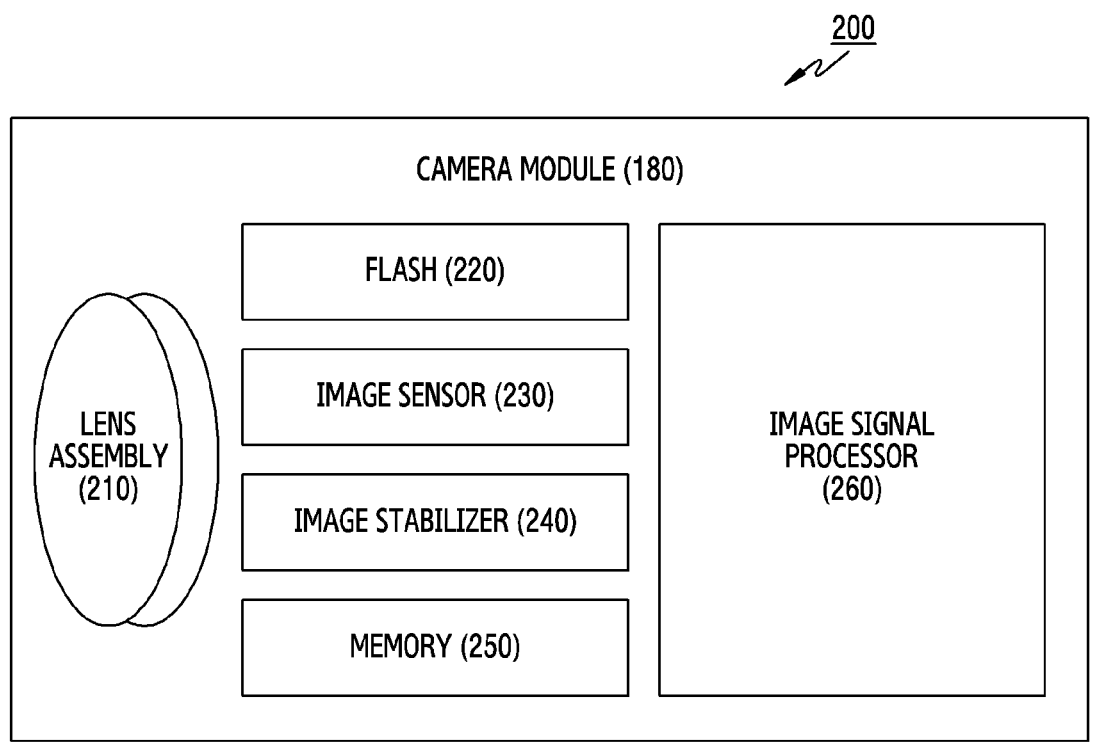
FIG. 2 is a block diagram 200 of a camera module 180 according to various embodiments.

FIG. 2 is a block diagram 200 illustrating the camera module 180 according to various embodiments.

Referring to FIG. 2, the camera module 180 may include a lens assembly 210, a flash 220, an image sensor 230, an image stabilizer 240, memory 250 (e.g., buffer memory), or an image signal processor 260.

The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens. The flash 220 may emit light that is used to reinforce light reflected from an object. The flash 220 may include one or more light emitting diodes (LEDs) (e.g., a red-green-blue (RGB) LED, a white LED, an infrared (IR) LED, or an ultraviolet (UV) LED) or a xenon lamp.

The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
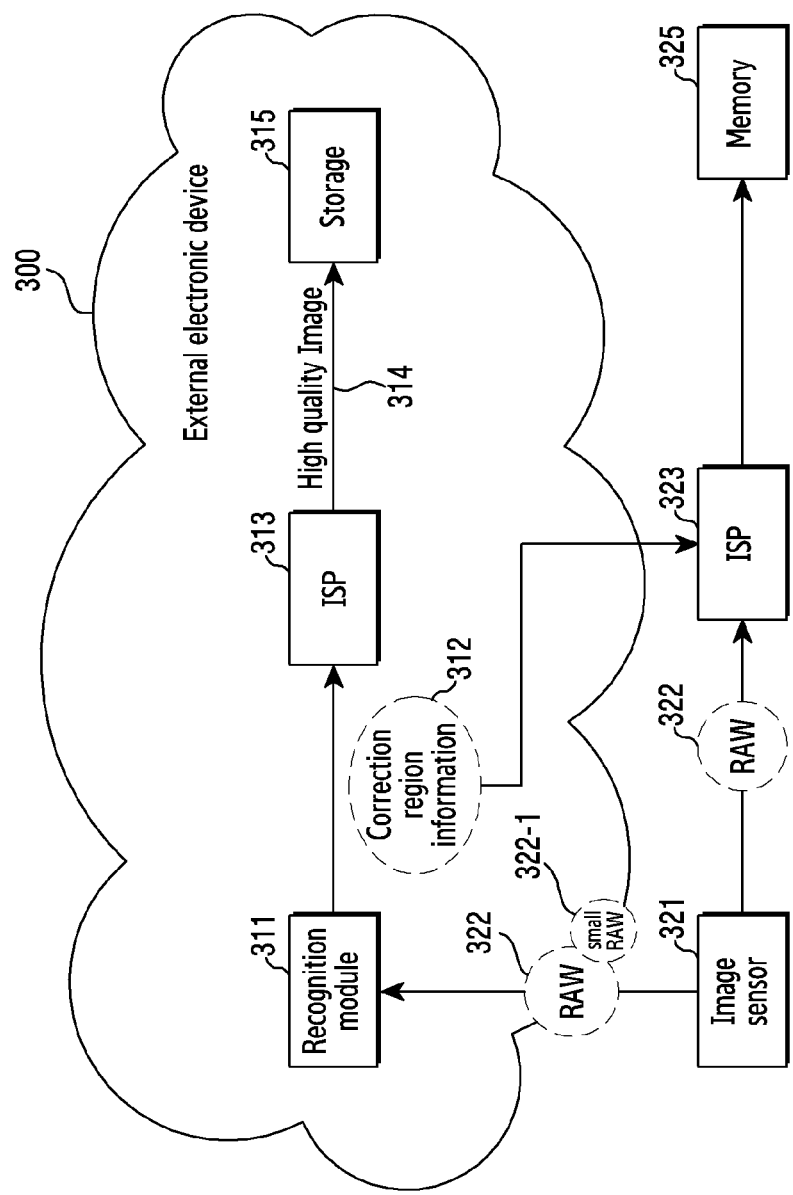
FIG. 3 is a conceptual diagram for describing an image correction method of an electronic device and an external electronic device according to various embodiments.

FIG. 3 is a conceptual diagram for describing an image correction method of an electronic device and an external electronic device according to various embodiments.

Referring to FIG. 3, the electronic device 101 may include an image sensor 321, an image signal processor (ISP) 323, and a memory 325. An external electronic device 300 may include a recognition module 311, an ISP 313, and storage 315. The recognition module 311 may be a logic module, and may be implemented as a processor of the external electronic device 300. The ISP 313 may also be implemented as a processor of the external electronic device 300. For example, the processor of the external electronic device 300 may perform both recognition and image processing. Although not illustrated, the electronic device 101 may include a communication module (e.g. the communication module 190) which can transmit or receive data to or from the external electronic device 300. The external electronic device 300 may include a communication module which can transmit or receive data to or from the electronic device 101.

The image sensor 321 (e.g. the camera module 180) may acquire an image of an external object and may generate a raw image 322 corresponding thereto. The image sensor 321 may transfer the raw image 322 to the ISP 323. In various embodiments of the disclosure, the image sensor 321 may generate a small raw image 322-1 and may transmit the same to the external electronic device 300 through the communication module. In another embodiment, the processor of the electronic device 101, instead of the image sensor 321, may generate the small raw image 322-1 and may transmit the generated small raw image 322-1 to the external electronic device 300 through the communication module. The image sensor 321 may transmit the raw image 322 in a compressed state to the ISP 323 or to the external electronic device 300. The image sensor 321 may compress the raw image 322 for partial processing of the raw image 322 and may store the compressed the raw image 322 in a memory in the image sensor 321.

The recognition module 311 of the external electronic device 300 may acquire the small raw image 322-1 through the communication module, and may segment at least one image region from the small raw image 322-1. The recognition module 311 may recognize each of the at least one image region resulting from the segmentation. Correction region information 312, including information associated with multiple image regions generated from the recognition module 311, for example, at least one of coordinate information of the image region or a recognition result, may be generated. The correction region information 312 may be transmitted to the electronic device 101. The ISP 323 may correct the raw image 322 by using the correction region information 312, and thus a corrected image may be generated. The corrected image may have a format of YUV, for example. The corrected image may be stored in the memory 325. Alternatively, the corrected image may be compressed according to, for example, a JPEG method, and the compressed image may be stored in the memory 325.

In various embodiments of the disclosure, the raw image 322 provided from the image sensor 321 may be transmitted to the external electronic device 300 separately from the small raw image 322-1. Since the raw image 322 has a larger capacity than the small raw image 322-1, the small raw image 322-1 may first be transmitted to the external electronic device 300, and then the raw image 322 may be transmitted to the external electronic device 300. For example, the raw image 322 may be transmitted to the external electronic device 300 while the ISP 323 corrects the raw image 322. The raw image 322 may be uploaded to the external electronic device 300 as it is generated by the image sensor 321, or a preprocessed image in which lens distortion compensation or noise removal has been performed may be uploaded.

The preprocessing described above may be performed in the external electronic device 300. The external electronic device 300 may perform demosaic processing, image format modification, or preprocessing to increase an image recognition rate. The ISP 313 of the external electronic device 300 may correct the received raw image 322. The external electronic device 300 may correct the raw image 322 by using the previously generated correction region information 312, or may correct the raw image 322 by using the extended correction region information. The raw image 322 may have a higher resolution than the small raw image 322-1. Accordingly, the ISP 313 of the external electronic device 300 may obtain more detailed extended correction region information from a high-quality image. The ISP 313 may generate the expanded correction region information by using the generated correction region information and the raw image 322 together. The ISP 313 may acquire a high-quality image 314 by correcting the raw image 322 using the extended correction region information. The high-quality image 314 may be stored in the storage 315 of the external electronic device 300, or may be downloaded to the electronic device 101.

Figure 4:
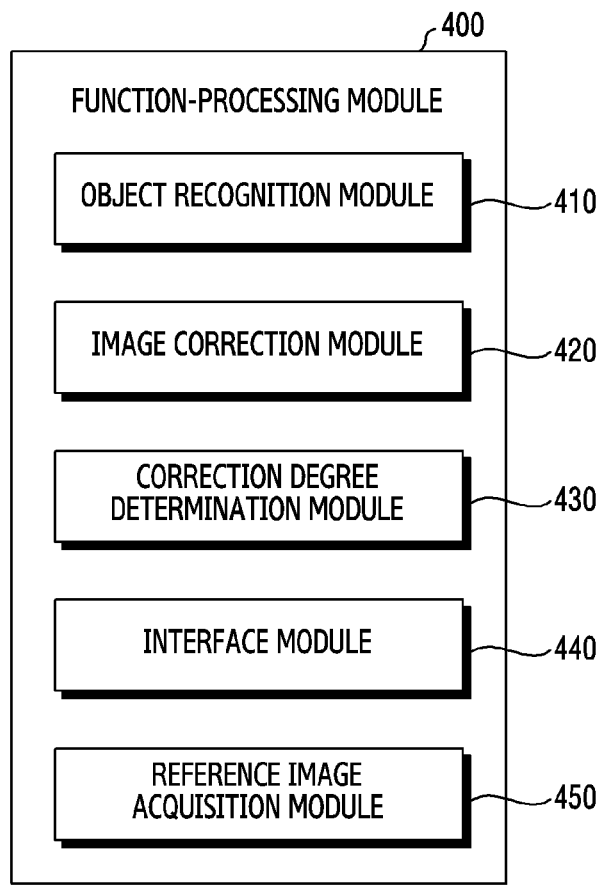
FIG. 4 illustrates an example of a function-processing module in an electronic device according to various embodiments.

FIG. 4 illustrates an example of a function-processing module in an electronic device according to various embodiments.

Referring to FIG. 4, FIG. 4 may illustrate an example of a function-processing module 400 relating to, in the electronic device (e.g. the electronic device 101 in FIG. 1), recognizing an object (or an object region) included in an image, correcting the image on the basis of the recognized object, and additionally performing image correction according to a user input on the basis of the correction degree of the corrected image. In various embodiments, the function-processing module 400 may be included as a hardware module in a processor (e.g. the processor 120 in FIG. 1) including a processing circuit, or may be included as a software module.

The function-processing module 400 may process an image correction operation. In various embodiments, the function-processing module 400 may indicate a module for processing an operation related to image correction. The function-processing module 400 may include an object recognition module 410, an image correction module 420, a correction degree determination module 430, an interface module 440, or a reference image acquisition module 450.

The object recognition module 410 may recognize an object (or an object region) included in an image. The image may be an original image before correction. The image may include a preview image (or raw data (e.g. the raw image 322) acquired in real time from a camera module (e.g. camera module 180) or an image or a video stored in a memory (e.g. the memory 130). For reference, the memory 130 may store images (or image data) in various formats, such as the raw image 322, compressed data (e.g. an image compressed for storage), a region of interest (ROI) acquired from the recognition module (e.g. the recognition module 311), image data, and correction data acquired from the analysis data image correction module 420. The object can be obtained (or identified) from the image, and may represent, for example, a figure (or person), a thing (e.g. a tree, a building, a road, etc.), a background (e.g. the sky, the sea, the land, etc.). The object region is a region at least partially or entirely corresponding to the object, and may include a region surrounding the object.

The object recognition module 410 may be configured as an object detection engine, an object recognition engine, or an object segmentation engine. Each engine includes hierarchical layers and learning coefficients learned by a deep-learning architecture. For example, the object detection engine may recognize position coordinates of an object in an image. The object recognition engine may recognize or identify an object in the image. The object segmentation engine may define boundaries (e.g. regions) between recognized objects. The object recognition module 410 may transmit an object recognized from the image to the image correction module 420. The transmitted object may include, as object information, for example, the position coordinates, the category (e.g. a person, a thing, or a background), the region, and the like of the object.

The image correction module 420 may correct the image based on the recognized object. For example, the image correction module 420 may be configured as a detection-based drawing engine, a pattern (or patch)-based drawing engine, or a deep-learning-based image restoration engine. For example, the detection-based engine may recognize directional information of an object (e.g. hair) included in an image, and may draw a corresponding texture or new texture on the basis of the directional information. The pattern-based drawing engine may recognize pattern information (e.g. patterned clothing, a wallpaper pattern, etc.) of an object (e.g. a thing) included in the image and may supplement the resolving power of the object on the basis of the pattern information. The deep learning-based image restoration engine may learn a database of a specific object by deep learning and restore the resolving power of the target object to ultrahigh resolving power by a learning coefficient learned by itself.

The image correction module 420 may correct the image by using each engine according to a classification of a designated object or a designated region of the image (e.g. part or all of the image). The image correction module 420 may correct a compressed image and transmit the corrected image to the correction degree determination module 430. The image correction module 420 may receive target object information and positional information of an object to be additionally corrected (or newly corrected) from the user through the interface module 440. For the object requested to be additionally corrected, the image correction module 420 may additionally correct the corrected image by using a reference image acquired from the reference image acquisition module 450. The image correction module 420 may combine an original image and the corrected image on the basis of the correction degree (or correction information) received from the image correction determination module 430.

The correction degree determination module 430 may distinguish an object in which an error may occur by image correction (or an object in which an error is likely to be recognized by the user). For example, when an image including a person's face and a tree is corrected, the correction of the person's face should be carefully performed because the image may appear very awkward (strange) to a user when the positions of the person's eyes, nose, and mouth are slightly different from a real object. On the other hand, in the case of a tree, the tree is less likely to appear strange to the user due to the different positions of random textures (e.g. leaves and branches). In this respect, the correction degree determination module 430 may differently configure the degree of correction for each object. For example, the correction degree determination module 430 may classify objects by category and may configure the degree of correction for each category of objects. The correction degree determination module 430 may configure the degree of correction on the basis of at least one among the number of times (or how many times) an object is included in an image, whether the image includes a letter or a symbol, the similarity between an uncorrected image and a corrected image, and an object recognition rate. The correction degree determination module 430 may configure the object correction degree by using the object recognition rate and the difference between the corrected image and the uncorrected image.

The interface module 440 may receive an input from the user. The interface module 440 may display the corrected image through a display device (e.g. the display device 160) and may detect a user input via an input device (e.g. the input device 150). The interface module 440 may detect a user input for selecting at least one object or selecting at least one reference image. The interface module 440 may transmit the position information of the selected object to the image correction module 420. The interface module 440 may display a selectable object so that it is distinguishable (e.g. color, size, shape, highlight, letter display, etc.) from an object that is not selectable.

The reference image acquisition module 450 may retrieve at least one reference image associated with an object. The reference image may be the same as or similar to the object recognized by the object recognition module 410. The reference image acquisition module 450 may retrieve, as the reference image, an image (e.g. a user picture, a picture of a user's acquaintance, etc.) stored in the memory 130 or an image registered (or uploaded) on the Internet by using an Internet account (e.g. a social network service (SNS)) associated with the user of the electronic device 101. Alternatively, the reference image acquisition module 450 may search the Internet for an image of the recognized object, regardless of the user.

The object recognition module 410, the image correction module 420, the correction degree determination module 430, and the reference image acquisition module 450 according to various embodiments may be included in the external electronic device 300. The electronic device 101 may transmit an image to the external electronic device 300, and image correction may be performed in the external electronic device 300. Here, the external electronic device 300 may be a server that processes image correction.

In accordance with various embodiments, an electronic device (e.g. the electronic device 101) may include a communication module (e.g. the communication module 190), a memory (e.g. the memory 130), and a processor (e.g. the processor 120), wherein the processor 120 may be configured to: recognize at least one of one or more objects by using an image including the one or more objects; identify, based at least on the recognition, a recognition rate and a category corresponding to the at least one object; acquire, based at least on the category, at least one reference image corresponding to the object; when the recognition rate satisfies a first designated condition related to the recognition rate corresponding to the category, correct the at least one object or a region corresponding to the at least one object by using a reference image satisfying the first designated condition among the at least one reference image; and when the recognition rate satisfies a second designated condition related to the recognition rate corresponding to the category, correct the at least one object or the region corresponding to the at least one object by using a reference image, selected according to an input, from among the at least one reference image.

The processor may be configured to generate correction information further based on the difference between image information before the correction of the object region and image information after the correction of the object region.

The processor may be configured to display an indicator corresponding to the correction information in association with the object region.

The processor may be configured to receive, from a user, an input for a partial region of the image and to determine the object region based on the input.

The processor may be configured to: using the communication module, transmit the image to an external electronic device such that the external electronic device generates a corrected image in which image correction processing has been performed on the image; and receive the corrected image from the external electronic device.

The processor may be configured to further perform correction processing at least partially different from the correction processing by the external device with respect to the received corrected image.

The processor may be configured to transmit the image to an external electronic device by using the communication module, receive processing information for image correction processing for the image from the external electronic device, and correct the image by using the received processing information.

In accordance with various embodiments, an electronic device (e.g. the electronic device 101) may include: a memory (e.g. the memory 130); a display (e.g. the display device 160); and a processor (e.g. the processor 120) functionally connected to the memory 130 or the display, wherein the processor 120 may be configured to: recognize at least one object included in an image; correct the image based on the recognized object; display the corrected image and a reference image associated with the recognized object on the display; and additionally correct the corrected image by using a reference image selected according to a user input.

The processor may be configured to: determine a correction degree of the object based on a recognition rate of the object; and correct the image based on the correction degree.

The processor may be configured to combine, based on the correction degree, the corrected image with the image.

The processor may be configured to: determine an object recognition rate and an object category corresponding to the recognized object; and acquire, based on the determined object category, at least one reference image corresponding to the object.

The processor may be configured to acquire, as the reference image, an image corresponding to the object from images stored in the memory, or to acquire, as the reference image, an image corresponding to the object from images registered on the Internet based on a user account of the electronic device.

The processor may be configured to distinguishably display, on the display, an additionally correctable object and an additionally uncorrectable object among at least one object included in the corrected image.

The processor may be configured to: when the additionally correctable object is selected, display at least one reference image associated with the selected object; select at least one reference image from among the displayed reference images; and additionally correct the selected object by using the selected reference image.

The processor may be configured to: select, based on the user input, at least one object and at least one reference image included in the corrected image; and additionally correct the selected object by using the selected reference image.

The processor may be configured to: generate correction information based on the difference between the image and the corrected image; or acquire the correction information from an external electronic device.

Figure 5:
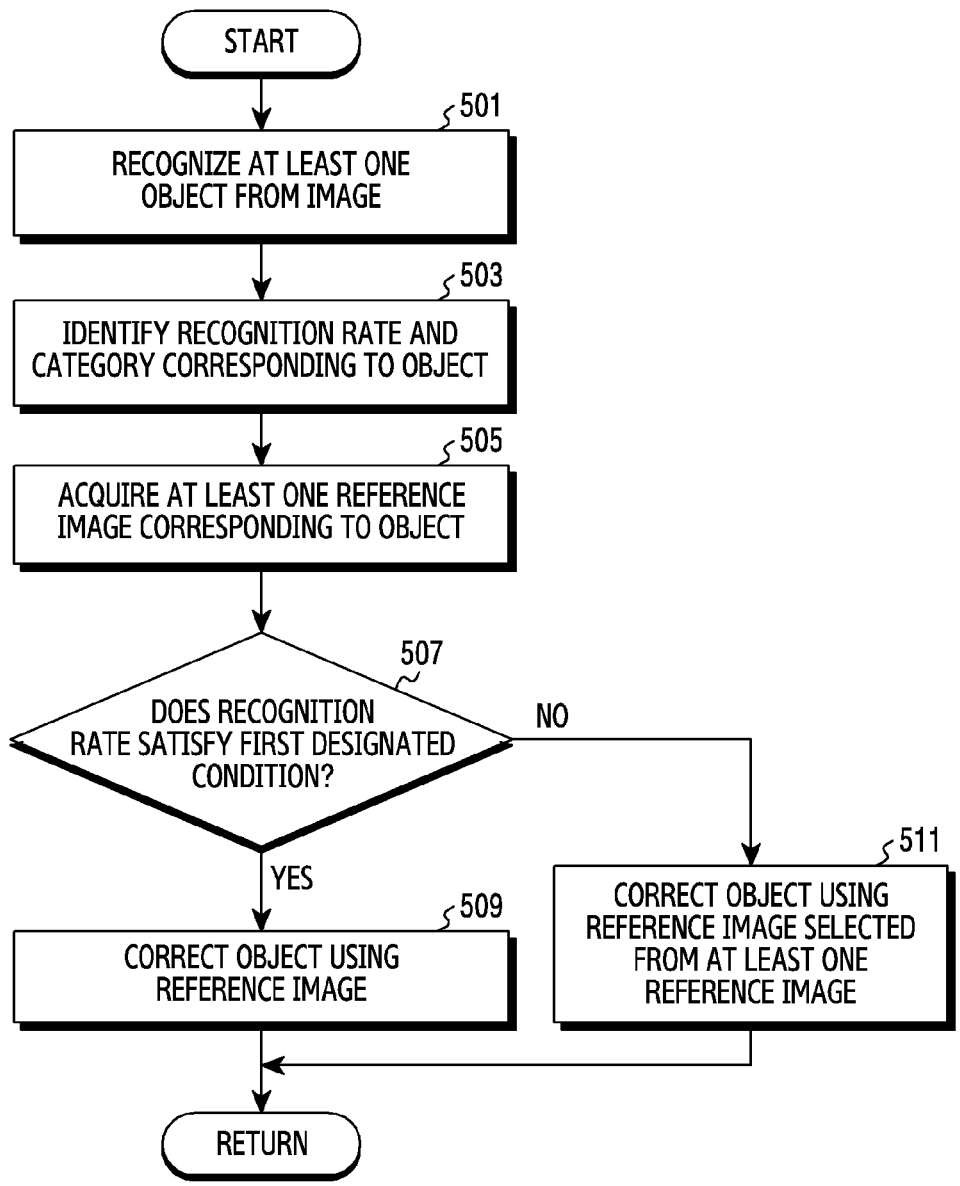
FIG. 5 is a flowchart illustrating an operation method of an electronic device according to various embodiments.

FIG. 5 is a flowchart illustrating an operation method of an electronic device according to various embodiments.

Referring to FIG. 5, in operation 501, the processor 120 of the electronic device 101 may recognize at least one object from an image. The image may be an original image, and may include a preview image obtained in real time from a camera module (e.g. the camera module 180) or an image or video stored in a memory (e.g. the memory 130). The image may include one or more objects. The processor 120 may recognize at least one object among one or more objects by using an image including the one or more objects. The at least one object may be a person, a thing, or a background. The processor 120 may recognize the position coordinates of the object (or the object region) from the image by using the object detection engine, may recognize the object (or the category of the object) by using the object recognition engine, and may define boundaries (e.g. an object region) between the recognized objects by using the object segmentation engine.

In operation 503, the processor 120 of the electronic device 101 may determine, based at least on the recognition, a recognition rate and a category corresponding to the at least one object. The recognition rate is a probability of recognizing an object, and the recognition rate may differ depending on, for example, the object (or the category of the object). For example, when the image includes a person, a thing, and a background, the recognition rate for the person may be 65%, the recognition rate for the thing may be 70%, and the recognition rate for the background may be 60%. The category may relate to whether an object corresponds to one among a person, a thing, or a background.

In operation 505, the processor 120 of the electronic device 101 may acquire, based at least on the category, at least one reference image corresponding to the object. The reference image may be the same as or similar to the object. The processor 120 may obtain a reference image corresponding to the object in a variety of ways. For example, the reference image may be a user's photograph stored in the memory (e.g. the memory 130), a photograph of someone else who resembles the user, or an image of a circularly or elliptically shaped thing (e.g. a ball, a mirror). Alternatively, the reference image may be an image registered on the Internet on the basis of a user account of the electronic device 101.

In operation 507, the processor 120 of the electronic device 101 may determine whether the recognition rate satisfies a first designated condition associated with a recognition rate corresponding to the category. Since the recognition rate may differ depending on the category of the object, the recognition rate that satisfies a condition designated depending on the category may be different. For example, the first designated condition may be that the recognition rate for a person is 80% or more, the recognition rate for a thing is 60% or more, and the recognition rate for a background is 50% or more. Thus, the processor 120 may determine whether the recognition rate for each object satisfies the recognition rate corresponding to the category.

The processor 120 may perform operation 509 when the recognition rate satisfies the first designated condition and may then perform operation 511 when the recognition rate satisfies a second designated condition associated with the recognition rate corresponding to the category.

When the recognition rate satisfies the first designated condition, in operation 509, the processor 120 of the electronic device 101 may correct the at least one object by using the at least one reference image. For example, the processor 120 may correct the at least one object or a region corresponding to the at least one object by using a reference image that satisfies the first designated condition among the at least one reference image. The object region may be a region at least partially or entirely corresponding to the object, and may include a region surrounding the object. In the case of correcting only the object, there may be a difference between the corrected object and the uncorrected region around the object, and thus the processor 120 may correct the region corresponding to the at least one object.

When the recognition rate satisfies the second designated condition, in operation 511, the processor 120 of the electronic device 101 may correct the at least one object by using the selected reference image. The second designated condition may be higher or lower than the first designated condition. For example, the first designated condition may be equal to or greater than 50% and the second designated condition may be less than 30%. For example, the processor 120 may display the at least one reference image, and, when a user selects at least one reference image from among the displayed reference images, may use the selected reference image to correct the at least one object or a region corresponding to the at least one object.

The processor 120 of the electronic device 101 according to various embodiments may generate correction information further based on the difference between image information of the object region and image information obtained by correcting the object region using the reference image. The processor 120 may acquire the correction information from the external electronic device 300. The processor 120 of the electronic device 101 according to various embodiments may receive an input from a user for a partial region of the image and may determine the object region based on the input. The processor 120 of the electronic device 101 according to various embodiments may display an indicator corresponding to the correction information on the display device (e.g. the display device 160) in association with the object region.

Figure 6:
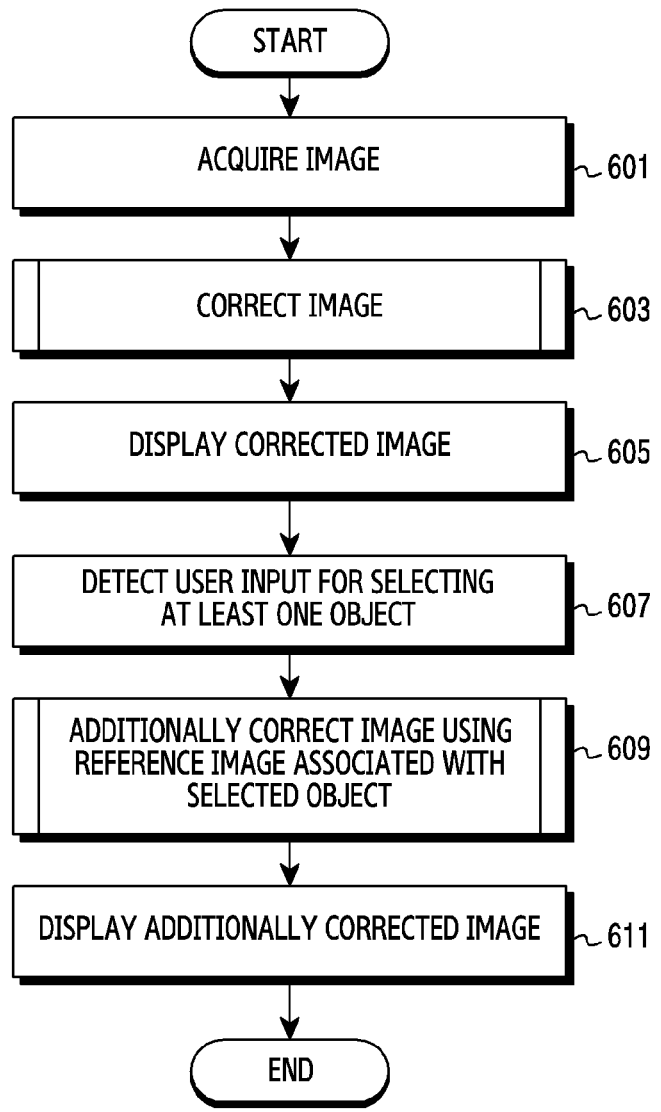
FIG. 6 is a flowchart illustrating an image correction method of an electronic device according to various embodiments.

FIG. 6 is a flowchart illustrating an image correction method of an electronic device according to various embodiments.

Referring to FIG. 6, in operation 601, the processor 120 of the electronic device 101 may acquire an image. The image may be an original image before correction. The image may include a preview image (or raw data (e.g. the raw data 322)) acquired in real time from a camera module (e.g. the camera module 180) or an image or video stored in a memory (e.g. the memory 130).

In operation 603, the processor 120 of the electronic device 101 may correct the acquired image. The processor 120 may recognize at least one object included in the image and may correct the image by using feature points included in the recognized object. Alternatively, the processor 120 may recognize at least one object by using feature points included in the image, and may correct the image by using the feature points included in the recognized object. The method for recognizing an object from an image or extracting feature points from the image corresponds to the prior art, and thus a detailed description thereof may be omitted.

For example, the processor 120 may determine an object category by using feature points. The object category relates to the type of recognized object, and may be classified into, for example, a person, a thing, and a background. The object category may be broadly classified into a person, a thing, and a background. However, with regard to a person, the object category may be further divided into a face, a body, a hand, etc. With regard to a thing, the object category may be divided into a tree, a leaf, a building, a window, etc. Further, with regard to a background, the object category may be divided into the sky, the sea, a river, etc. The processor 120 may correct each object on the basis of object recognition rates (e.g. 90%, 85%, etc.) designated for each object category (e.g. a person, a thing, a background, etc.). The processor 120 may perform correction (e.g. correction of 50% or more) only on an object having a high recognition rate and may perform almost no correction on an object having a low recognition rate (e.g. correction of less than 10%). For example, correction of less than 10% may correspond to brightness, sharpness, and contrast adjustment. Correction of 50% or more may correspond to the correction of a size, a contour (or boundary), and a blemish. Alternatively, the processor 120 may acquire a reference image associated with the recognized object, and may use the acquired reference image to correct the object.

The processor 120 according to various embodiments may retrieve, as a reference image, an image (e.g. a user picture, a picture of a user's acquaintance, etc.) stored in the memory 130 or an image registered (or uploaded) on the Internet through Internet access using an Internet account associated with the user of the electronic device 101. The processor 120 may search the Internet for an image of a recognized object regardless of the user. The image correction procedure will be described in detail with reference to FIG. 7.

In operation 605, the processor 120 of the electronic device 101 may display the corrected image on a display device (e.g. the display device 160). With respect to an object having a low degree of object correction or a high risk of correction, the processor 120 may visually display an object recognition rate and the degree of object correction by using a color or a numeral, in addition to displaying a segmentation region. That is, the processor 120 may display, based on the object recognition rate, objects included in the corrected image in a distinguishable manner. For example, the processor 120 has performed almost no correction on an object having a low recognition rate, and thus may additionally correct the object having a low recognition rate. To this end, the processor 120 may distinguishably display an additionally correctable object and an additionally uncorrectable object. The processor 120 may provide the corrected image and a reference image associated with the additionally correctable object together so as to guide at least one object included in the corrected image to be additionally correctable.

The processor 120 according to various embodiments may display a reference image associated with the recognized object when displaying the corrected image. The reference image may be the same as or similar to the recognized object. The processor 120 may retrieve, as the reference image, an image (e.g. a user picture, a picture of a user's acquaintance, etc.) stored in the memory 130 or an image registered (or uploaded) on the Internet by using an Internet account associated with the user of the electronic device 101. Alternatively, the processor 120 may search the Internet for an image of a recognized object regardless of the user. The processor 120 may display an object correctable by the reference image differently from an object uncorrectable by the reference image.

In operation 607, the processor 120 of the electronic device 101 may detect a user input for selecting at least one object. The processor 120 may detect a user input for selecting at least one object from among multiple objects included in the corrected image. The processor 120 may recognize, based on position information of the selected object, the selected object based on at least one among a surrounding segmentation region, an object recognition rate, a boundary between objects, or an object color. The processor 120 may display a reference image corresponding to the selected object in response to the user input. For example, the processor 120 may display only a corrected image in operation 605. In operation 607, when an object is selected, the processor 120 may display a reference image corresponding to the selected object. Alternatively, the processor 120 may display a reference image together with a corrected image in operation 605, and may select an object and a reference image in response to the user input in operation 607.

The processor 120 according to various embodiments may directly receive, from the user, selection for an object that requires additional correction. The processor 120 may recognize the object to be additionally corrected based on a user input designating the boundary of the object. Alternatively, the processor 120 may recognize, based on position information touched (selected) by the user, an object to be additionally corrected based on at least one among a surrounding segmentation region, an object recognition rate, a boundary between objects, or an object color.

In operation 609, the processor 120 of the electronic device 101 may additionally correct the image by using a reference image associated with the selected object. For example, the processor 120 can additionally correct an object having a low recognition rate because little correction has been performed thereon. The processor 120 may correct the object based on the object recognition rate when the object is corrected using the reference image. For example, the processor 120 may replace the object selected by the user with the selected reference image, or may correct the selected object by using the selected reference image. The processor 120 may additionally correct the image by using the reference image, thereby improving the corrected image. The operation of additionally correcting the image using the reference image will be described in detail with reference to FIG. 8.

In operation 611, the processor 120 of the electronic device 101 may display the additionally corrected image. When there is an object to be additionally corrected among objects included in the additionally corrected image, the processor 120 may display the object to be additionally corrected differently from an object not to be additionally corrected. In addition, the processor 120 may display a reference image associated with the object to be additionally corrected among the objects included in the additionally corrected image. The processor 120 may repeat operations 607 and 609 according to the user's selection, thereby improving the corrected image.

Figure 7:
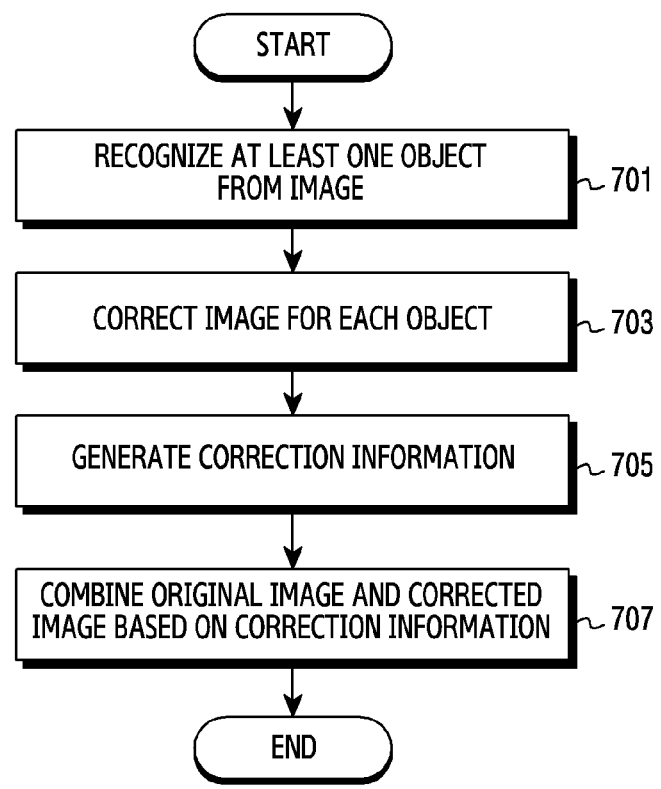
FIG. 7 is a flowchart illustrating an image correction method based on an object according to various embodiments.

FIG. 7 is a flowchart illustrating an image correction method based on an object according to various embodiments. FIG. 7 illustrates operation 603 of FIG. 6 in detail.

Referring to FIG. 7, in operation 701, the processor 120 of the electronic device 101 may recognize at least one object from an image. The processor 120 may recognize or identify an object in the image, may recognize the position coordinates of the identified object, and may define a boundary (e.g. a region) between recognized objects.

In operation 703, the processor 120 of the electronic device 101 may correct the image for each of the recognized objects. For example, the processor 120 may identify a recognition rate and a category of an object, and may correct the image based on the recognition rate and the category. When the recognized object is a person, the processor 120 may divide the person into a face (or a face region), hair (or a hair region), and a body (or a body region), may correct the face on the basis of the recognition rate of the face, may draw the corresponding texture on the basis of directional information of the hair, and may correct the resolution of the body on the basis of pattern information corresponding to the body.

That is, with respect to the object, the category of which is defined as "person", the processor 120 may classify the object into a face object, a hair object, and a body (e.g. a thing) object, and may then appropriately correct each object. In addition, when the recognized object is a tree, the processor 120 may correct a tree object based on the object category (e.g. a thing) and the recognition rate of the tree. In addition, when the recognized object is the sky, the processor 120 may correct a sky object based on the object category (e.g. a background) and the recognition rate of the sky.

The processor 120 according to various embodiments may differently apply the degree of correction based on the recognition rate of the object. For example, the processor 120 may correct an object or an object region on the basis of a first designated condition (e.g. 80% correction) for an object having a high recognition rate. The processor 120 may correct the object or an object region on the basis of a second designated condition (e.g. 30% correction) for an object having a low recognition rate.

The processor 120 according to various embodiments may distinguish objects that are likely to cause an error by image correction, and may configure different degrees of correction for the respective objects. For example, the processor 120 may classify objects by category and may configure the degree of correction for each category of object. The processor 120 may configure the degree of correction based on at least one among the number of times (or how many times) an object is included in an image, whether the image includes letters or symbols, the similarity between an uncorrected image and a corrected image, and an object recognition rate. The correction degree determination module 430 may configure the object correction degree by using the object recognition rate and the difference between the corrected image and the uncorrected image.

The processor 120 of the electronic device 101 according to various embodiments may transmit the image (e.g. the original image or the raw data 322) to an external electronic device (e.g. the external electronic device 300) via a communication module (e.g. the communication module 190) for image correction processing of the image, and may receive a corrected image from the external electronic device 300. Alternatively, the processor 120 may receive processing information for the image correction processing of the image from the external electronic device 300 via the communication module 190, and may correct the image by using the received processing information. Alternatively, the processor 120 may receive an image obtained by correcting one portion of the image from the external electronic device 300 via the communication module 190, may correct another portion of the image, and may correct the image by combining a portion of the received image and the another corrected portion of the image.

In operation 705, the processor 120 of the electronic device 101 may generate correction information. The processor 120 may generate object-specific correction information. For example, the processor 120 may generate the correction information based on the difference between an original image and a corrected image. Alternatively, the processor 120 may generate the correction information on the basis of the difference between image information of an object region and image information obtained by correcting the object region by means of the reference image. The correction information may be acquired from the external electronic device 300. The processor 120 may receive the correction information from the external electronic device 300 via the communication module (e.g. the communication module 190). The processor 120 of the electronic device 101 according to various embodiments may display an indicator corresponding to the correction information on a display device (e.g. the display device 160) in association with the object region.

In operation 707, the processor 120 of the electronic device 101 may combine the original image and the corrected image on the basis of the correction information. For example, the processor 120 may combine the original image and the corrected image on the basis of an object recognition rate included in the correction information. The processor 120 may maintain the original image when the object recognition rate is low. The processor 120 may replace the original image with the corrected image when the object recognition rate is high. The processor 120 according to various embodiments may combine, based on the correction information, an original object and a corrected object for each object. The processor 120 may maintain an object having a low object recognition rate as it is without correcting the object. The processor 120 may correct an object having a high object recognition rate. When the object recognition rate of an object is low, if the object is corrected incorrectly, the object after the correction may be highly likely to appear strange to the user. To prevent such a case, the processor 120 may correct the object based on the object recognition rate.

Figure 8:
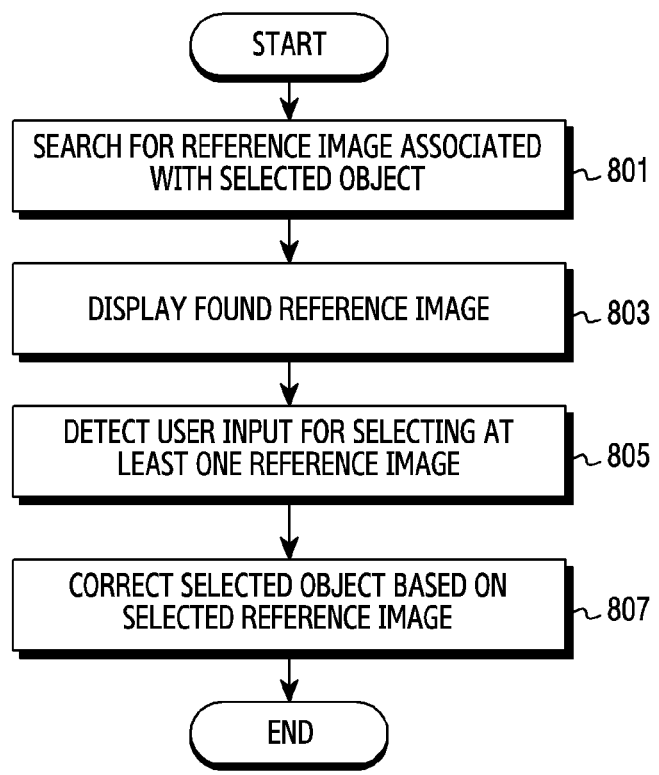
FIG. 8 is a flowchart illustrating an image correction method using a user selection and a reference image according to various embodiments.

FIG. 8 is a flowchart illustrating an image correction method using a user selection and a reference image according to various embodiments. FIG. 8 illustrates operation 609 of FIG. 6 in detail.

Referring to FIG. 8, in operation 801, the processor 120 of the electronic device 101 may retrieve a reference image associated with a selected object. For example, the processor 120 may retrieve, as the reference image, an image corresponding to a selected object and selected from among images stored in a memory (e.g. the memory 130). The image corresponding to the selected object may be an image including an object identical to or similar to the selected object. The processor 120 may store a user account associated with the user of the electronic device in a trusted zone of the memory 130. The user account may refer to a user ID that is required when a user forms a personal relationship with another user through a network on the Internet, such as a social network service. The processor 120 may store the user account in the trusted zone for security purposes. The processor 120 may access a network through the stored user account and retrieve, as the reference image, an image corresponding to the selected object from among registered images.

The processor 120 according to various embodiments determines an object recognition rate by determining a higher accuracy of an object when primarily correcting an image. When a user requests additional correction, an object having a low accuracy may also be found as a reference image. For example, the processor 120 may identify the shape of the face and then search the memory 130 or the network for an image corresponding to a selected object.

In operation 803, the processor 120 of the electronic device 101 may display the retrieved reference image. For example, the processor 120 may display the reference image on a corrected image after primarily performing the image correction (e.g. after performing operation 603). The processor 120 may display a reference image list including multiple reference images on the corrected image. The processor 120 may display the reference images in descending order of similarity to the selected object. For example, the processor 120 may list images stored in the memory 130 starting with the most similar face, or may display, as the reference image, images having the most similar face shape among images (e.g. acquaintances' faces) retrieved over the network. In addition, the processor 120 may recognize the shape of the bag or the logo thereof, may search the web for products related to the logo, and may display reference images in descending order of similarity.

The processor 120 according to various embodiments may display a reference image on the basis of priority. For example, the priority may be higher in the order of a reference image retrieved from the memory 130, a reference image retrieved through a user account, and a reference image retrieved from the web. The processor 120 may configure the priority according to user configuration or configuration of the electronic device 101. The processor 120 may flexibly change the priority according to user preference.

In operation 805, the processor 120 of the electronic device 101 may detect a user input for selecting at least one reference image. The processor 120 may detect a user input for selecting one of the reference images displayed on the corrected image. At this time, the processor 120 may select only one reference image, or may select multiple reference images when there are multiple selected objects.

In operation 807, the processor 120 of the electronic device 101 may correct the selected object on the basis of the selected reference image. The processor 120 may correct the object on the basis of the object recognition rate. For example, the processor 120 may replace the object selected by the user with the selected reference image, or may correct the selected object by using the selected reference image. The processor 120 may correct at least one of the brightness, sharpness, contrast, size, contour, and blemish of the selected object by using the reference image. The processor 120 may perform operation 807 to make correction of 50% or more for an object that underwent correction of less than 10% in operation 603. The processor 120 may additionally correct the selected object or object region using the reference image, thereby improving the object correction rate.

An operation method of an electronic device according to various embodiments may include: recognizing at least one object included in an image; correcting the image based on the recognized object; displaying the corrected image and a reference image associated with the recognized object; and additionally correcting the corrected image by using a reference image selected according to a user input.

The correction may include: determining a correction degree of the object, based on a recognition rate of the object; and combining the image and the corrected image based on the correction degree.

The method may further include: determining an object recognition rate and an object category corresponding to the recognized object; and acquiring at least one reference image corresponding to the object, based on the determined object category.

The additional correction may include: selecting, based on the user input, at least one reference image and at least one object included in the corrected image; and additionally correcting the selected object by using the selected reference image.

Figure 9:
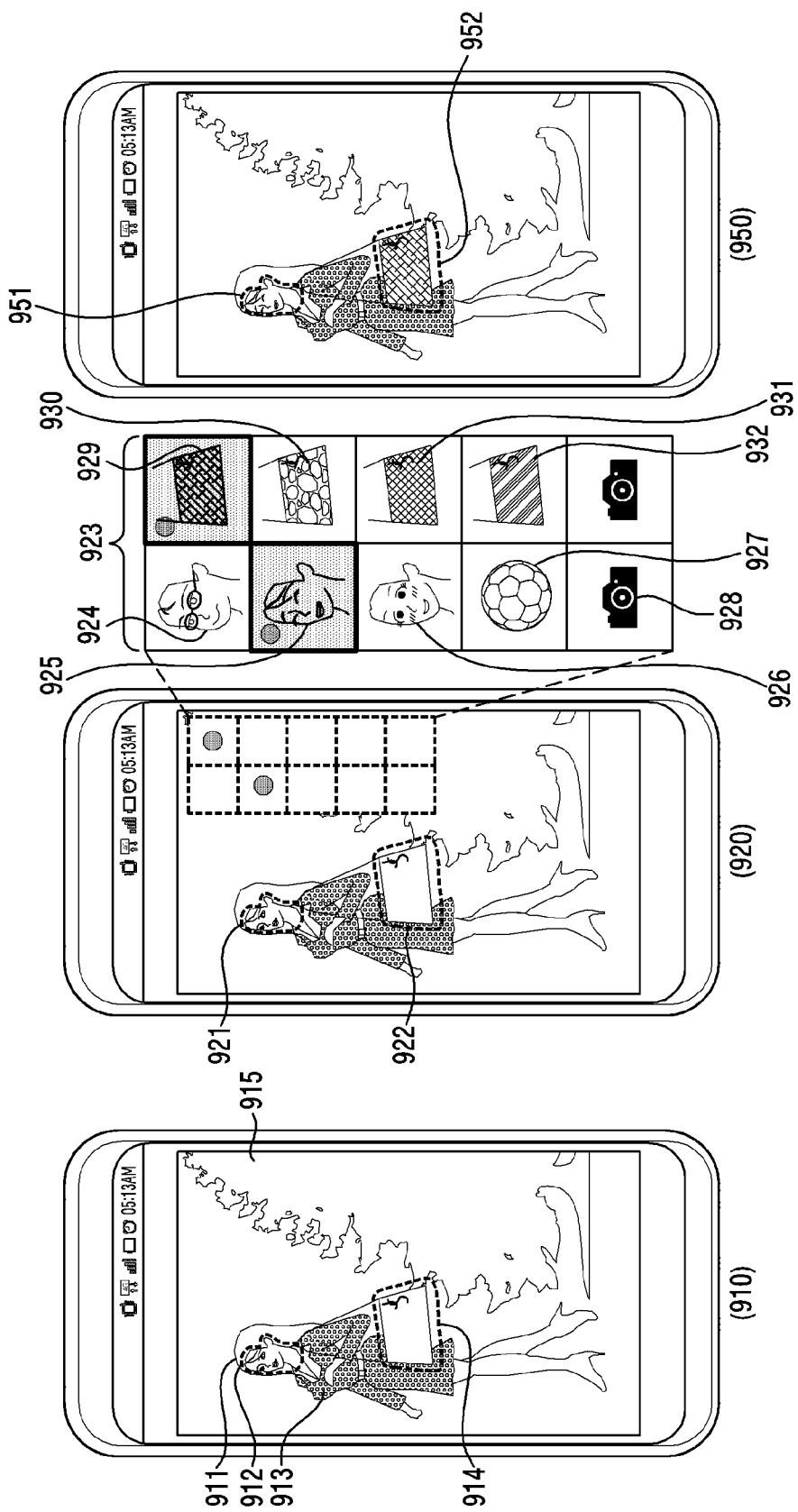
FIG. 9 and FIG. 10 illustrate an example of additionally correcting an image according to user selection according to various embodiments.
Figure 10:
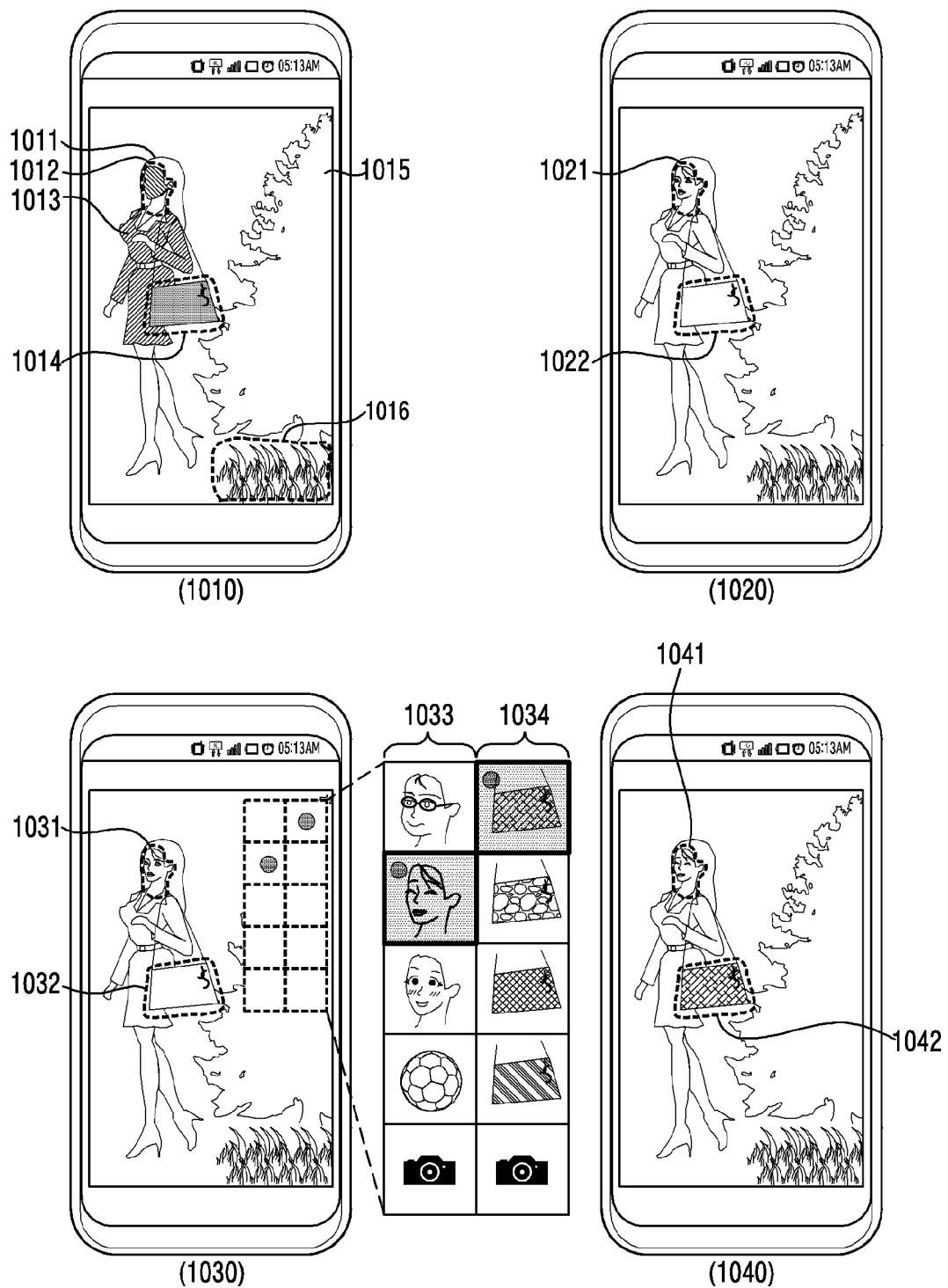

FIG. 9 and FIG. 10 illustrate an example of additionally correcting an image according to a user selection according to various embodiments.

FIG. 9 illustrates an example of selecting an object to be additionally corrected from a corrected image.

Referring to FIG. 9, the processor 120 of the electronic device 101 may display a first user interface 910 including a corrected image on a display device (e.g. the display device 160). The corrected image may include a person object (e.g. hair 911, a face 912, a body 913), a thing object 914, and a background object 915. The processor 120 may correct each object on the basis of an object recognition rate (e.g. 90%, 85%, or the like) designated for each object category (e.g. a person, a thing, a background, or the like). When the recognized object is a person object, the processor 120 may divide the person into the hair 911, the face 912 and the body 913, may draw a corresponding texture based on directional information of the hair 911, may correct the face based on the recognition rate of the face 912, and may correct the resolving power of the body on the basis of pattern information corresponding to the body 913.

The processor 120 may display a second user interface 920 including a reference image 923 in response to a user input for selecting an object. The processor 120 may detect a user input for selecting a face object 921 and a bag object 922, and may display, based on the detected user input, the reference image 923 corresponding to the selected object. The reference image 923 may include a first reference image 924, a second reference image 925, a third reference image 926, a fourth reference image 927, or a camera image capture button 928, which corresponds to the face object 921. The reference image 923 may also include a first reference image 929, a second reference image 930, a third reference image 931, a fourth reference image 932, or a camera image capture button 933, which corresponds to the bag object 922. When the camera image capture button 928 or 932 is selected, the processor 120 may drive the camera module 190 to acquire a new reference image and may display a preview image acquired from the camera module 190.

A user may select the second reference image 925 corresponding to the face object 921, and may select the first reference image 929 corresponding to the bag object 922. Although multiple objects and multiple reference images are shown as being selected in the drawing, the user may select one object and one reference image at one time. The processor 120 may display multiple reference images corresponding to one selected object, and may select one reference image from among the displayed reference images according to the user's selection.

The processor 120 may display a third user interface 950 having a selected object corrected using a selected reference image. For example, the processor 120 may correct a face object 951 by using the second reference image 925 selected to correspond to the face object 921. The processor 120 may correct a bag object 952 by using the first reference image 929 selected to correspond to the bag object 922.

FIG. 10 illustrates an example of distinguishable display of an object to be additionally corrected.

Referring to FIG. 10, the processor 120 of the electronic device 101 may display a first user interface 1010 including a corrected image on a display device (e.g. the display device 160). The corrected image may include a person object (e.g. hair 1011, a face 1012, and a body 1013), a thing object 1014, a first background object 1015, and a second background object 1016. The processor 120 may display additionally correctable objects (e.g. the face 1012, the body 1013, the thing object 1014, and the second background object 1016) so as to be distinguishable from the other objects (e.g. the hair 1011 and the first background object 1015). For example, a method of distinguishable display method may differently display a color, a size, a shape, a highlight, and a letter display. A user may identify objects displayed to be visually distinguishable and may easily recognize an object requiring additional correction.

The processor 120 may display a second user interface 1020 in which the processor detects a user input for selecting an object. The processor 120 may detect a user input for selecting a face object 1021 and a bag object 1022. The processor 120 may display, in response to the user input detection, a third user interface 1030 which includes a first reference image list 1033 and a second reference image list 1034 corresponding to the selected objects (e.g. the face object 1021 and the bag object 1022). The first reference image list 1033 may include a camera image capture button or a first reference image to a fourth reference image corresponding to the face object 1031. Also, the second reference image list 1034 may include a camera image capture button or a first reference image to a fourth reference image corresponding to the bag object 1032. The processor 120 may select one reference image from the first reference image list 1033 and may select one reference image from the second reference image list 1034.

The processor 120 may display a fourth user interface 1040 that has selected objects corrected using the selected reference images. For example, the processor 120 may correct a face object 1041 by using the second reference image selected to correspond to the face object 1031. The processor 120 may correct a bag object 1042 by using the first reference image selected to correspond to the bag object 1032.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
a communication module;
a memory; and
a processor, wherein the processor is configured to:
recognize at least one object included in an image comprising one or more objects;
identify, based at least on the recognition, a recognition rate and a category corresponding to the at least one object;
acquire, based at least on the category, at least one reference image corresponding to the at least one object, respectively;
when the recognition rate satisfies a first designated condition corresponding to the category, adjust the at least one object or a region corresponding to the at least one object by using a first reference image satisfying the first designated condition, among the at least one reference image; and
when the recognition rate satisfies a second designated condition corresponding to the category, (i) display the at least one reference image corresponding to the at least one object, (ii) detect a user input selecting a reference image of the at least one reference image, and (iii) adjust the at least one object or the region corresponding to the at least one object by using the selected reference image, and
wherein the recognition rate of the first designated condition is different from the recognition rate of the second designated condition.

2. The electronic device of claim 1, wherein the processor is configured to generate adjustment information based on a difference between image information before the adjustment and image information after the adjustment.

3. The electronic device of claim 2, wherein the processor is configured to display an indicator corresponding to the adjustment information in association with the region.

4. The electronic device of claim 1, wherein the processor is configured to:
receive, from a user, another input for a partial region of the image; and
determine the region based on the other input.

5. The electronic device of claim 1, wherein the processor is configured to:
using the communication module, transmit the image to an external electronic device such that the external electronic device generates an adjusted image in which image adjustment processing has been performed on the image; and
receive the adjusted image from the external electronic device.

6. The electronic device of claim 5, wherein the processor is configured to further perform adjustment processing at least partially different from the adjustment processing by the external electronic device with respect to the received adjusted image.

7. The electronic device of claim 1, wherein the processor is configured to:
using the communication module, transmit the image to an external electronic device;
receive processing information for image adjustment processing of the image from the external electronic device; and
adjust the image by using the received processing information.

8. An operation method of an electronic device, comprising:
recognizing an object from an image comprising at least one object;
adjusting the recognized object from the image;
after the recognized object is adjusted, displaying the image with an indication of a degree that the recognized object was adjusted;
detecting, on the displayed image, a first user input selecting the recognized object;
in response to detecting the first user input, acquiring at least one reference image corresponding to the selected object based on a category of the object;
displaying the adjusted image and the at least one reference image associated with the selected object;
acquiring a user input selecting one of the at least one reference image; and
in response to the acquiring of the user input, additionally adjusting the adjusted image by using the at least one reference image selected according to the user input.

9. The method of claim 8, wherein adjusting the image comprises:
determining an adjustment degree of the object based on a recognition rate of the object; and
combining the image and the adjusted image based on the adjustment degree.

10. The method of claim 8, further comprising:
determining an object recognition rate and an object category corresponding to the recognized object.

11. The method of claim 10, further comprising:
acquiring, as the reference image, an image corresponding to the object among images stored in a memory of the electronic device, or acquiring, as the reference image, an image corresponding to the object among images registered on an Internet based on a user account of the electronic device.

12. The method of claim 8, further comprising distinguishably displaying, on a display of the electronic device, an additionally adjustable object and an additionally non-adjustable object among the at least one object included in the adjusted image.

13. The method of claim 12, wherein the additional adjustment comprises:
when the additionally adjustable object is selected, displaying the at least one reference image associated with the selected adjustable object;
selecting the at least one reference image from among the displayed at least one reference image; and additionally adjusting the selected adjustable object by using the selected reference image.

14. The method of claim 8, wherein the additional adjustment comprises:
   selecting, based on the user input, the at least one reference image and the at least one object included in the adjusted image; and
   additionally adjusting the selected at least one object by using the selected reference image.

15. The method of claim 8, further comprising generating adjustment information based on a difference between the image and the adjusted image, or acquiring the adjustment information from an external electronic device.

* * * * *